(12) United States Patent
Schroeder et al.

(10) Patent No.: US 11,529,015 B2
(45) Date of Patent: Dec. 20, 2022

(54) BEVERAGE MAKER PLATEN OVERFLOW SENSING SYSTEM

(71) Applicant: B/E Aerospace, Inc., Winston-Salem, NC (US)

(72) Inventors: Christopher R. Schroeder, Overland Park, KS (US); David R. Howard, Olathe, KS (US); Justin D. Herrmann, Lenexa, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 856 days.

(21) Appl. No.: 16/433,207

(22) Filed: Jun. 6, 2019

(65) Prior Publication Data

US 2020/0383517 A1 Dec. 10, 2020

(51) Int. Cl.
*A47J 31/52* (2006.01)
*A47J 31/46* (2006.01)

(52) U.S. Cl.
CPC ........... *A47J 31/525* (2018.08); *A47J 31/461* (2018.08); *A47J 2203/00* (2013.01)

(58) Field of Classification Search
CPC .. A47J 31/5255; A47J 31/521; A47J 2203/00; A47J 31/461; A47J 31/525
USPC .................................................. 99/280, 300
See application file for complete search history.

(56) References Cited

U.S. PATENT DOCUMENTS

| 4,262,585 A * | 4/1981 | Leuschner ............ A47J 31/545 392/471 |
| 5,022,557 A | 6/1991 | Turner |
| 5,086,806 A | 2/1992 | Engler et al. |
| 6,526,872 B2 | 3/2003 | Wong |
| 6,672,200 B2 | 1/2004 | Duffy et al. |

(Continued)

FOREIGN PATENT DOCUMENTS

| CN | 106136896 A | 11/2016 |
| DE | 10330734 A1 | 2/2005 |

(Continued)

OTHER PUBLICATIONS

Extended Search Report for European Application No. 21155863.0 dated Jun. 1, 2021, 7 pages.

(Continued)

*Primary Examiner* — Jimmy Chou
(74) *Attorney, Agent, or Firm* — Suiter Swantz pc llo

(57) ABSTRACT

A beverage maker platen overflow sensing system is disclosed. The sensing system includes a process control board (PCB) in communication with solenoid valves of a manifold, the solenoid valves controlling the flow of hot water (e.g., for brewing coffee or tea) into a server positioned in a platen of the beverage maker. The PCB further includes an overflow detection circuit connected to the solenoid valves. Two signal probes are positioned near the forward edge of the platen. Similarly, ground probes are positioned in the platen below the signal probes and providing a ground path to the PCB. The overflow detection circuit generates an electrical signal between the signal probes and detects an overflow state when fluid in the platen grounds the signal between the signal probes and the ground probes. While the overflow persists, the overflow detection circuit ceases the water flow by electrically signaling the solenoid valves to close.

20 Claims, 6 Drawing Sheets

(56) References Cited

U.S. PATENT DOCUMENTS

| | | | |
|---|---|---|---|
| 7,293,458 B2* | 11/2007 | Ramus | A47J 31/005 73/304 R |
| 7,644,650 B2 | 1/2010 | Suzuki | |
| 7,673,556 B2 | 3/2010 | Spencer | |
| 7,891,287 B2* | 2/2011 | Miller | A47J 31/106 99/302 R |
| 2002/0152895 A1 | 10/2002 | Duffy et al. | |
| 2003/0126993 A1 | 7/2003 | Lassota et al. | |
| 2005/0126401 A1 | 6/2005 | Streeter et al. | |
| 2005/0178197 A1* | 8/2005 | Ramus | G01F 23/242 73/290 V |
| 2005/0183578 A1 | 8/2005 | Mandralis et al. | |
| 2006/0011069 A1 | 1/2006 | Spencer | |
| 2009/0095165 A1 | 4/2009 | Nosler et al. | |
| 2009/0136639 A1 | 5/2009 | Majer | |
| 2011/0061542 A1 | 3/2011 | Jimenez et al. | |
| 2011/0094389 A1 | 4/2011 | Coccia | |
| 2012/0328748 A1 | 12/2012 | Majer | |
| 2013/0062322 A1 | 3/2013 | Griffin | |
| 2013/0089649 A1 | 4/2013 | Feilner et al. | |
| 2013/0295244 A1 | 11/2013 | Reyhanloo | |
| 2014/0069279 A1* | 3/2014 | Upston | A47J 31/44 99/283 |
| 2014/0263397 A1 | 9/2014 | Jacobs | |
| 2015/0013546 A1* | 1/2015 | Kastor | A47J 31/061 99/300 |
| 2015/0157168 A1* | 6/2015 | Burrows | A47J 31/462 426/433 |
| 2015/0201796 A1 | 7/2015 | Kuempel et al. | |
| 2015/0216355 A1 | 8/2015 | Duvall | |
| 2015/0230655 A1 | 8/2015 | Hoog et al. | |
| 2015/0351580 A1 | 12/2015 | Ferraro et al. | |
| 2016/0109165 A1 | 4/2016 | Mackey et al. | |
| 2016/0150911 A1* | 6/2016 | Upston | A47J 31/3685 99/300 |
| 2016/0235244 A1 | 8/2016 | Bezzera | |
| 2018/0084940 A1 | 3/2018 | White et al. | |
| 2019/0014942 A1 | 1/2019 | Juve | |
| 2019/0125123 A1 | 5/2019 | Startz et al. | |
| 2019/0331516 A1 | 10/2019 | Freymiller et al. | |
| 2020/0352390 A1 | 11/2020 | Ceotto et al. | |
| 2020/0367689 A1 | 11/2020 | Illy et al. | |
| 2022/0160165 A1 | 5/2022 | Andreis et al. | |

FOREIGN PATENT DOCUMENTS

| | | | |
|---|---|---|---|
| EP | 1522247 A3 | 6/2005 | |
| EP | 1759617 A1 | 3/2007 | |
| EP | 1759617 B1 | 5/2008 | |
| EP | 3430951 A1 | 1/2019 | |
| EP | 3482660 A2 | 5/2019 | |
| JP | 3796066 B2 | 7/2006 | |
| WO | 2005048794 A1 | 6/2005 | |

OTHER PUBLICATIONS

Flow measurement—Wikipedia", May 2, 2019 (May 2, 2019), XP055806230, Retrieved from the Internet: URL:https://web.archive.org/web/20190502212410/https://en.wikipedia.org/wiki/Flow_measurement [retrieved on May 20, 2021] "pressure-based meters'; p. 6-p. 7.

Examination Report for European Application No. 19216302.0 dated Jul. 22, 2020, 11 pages.

* cited by examiner

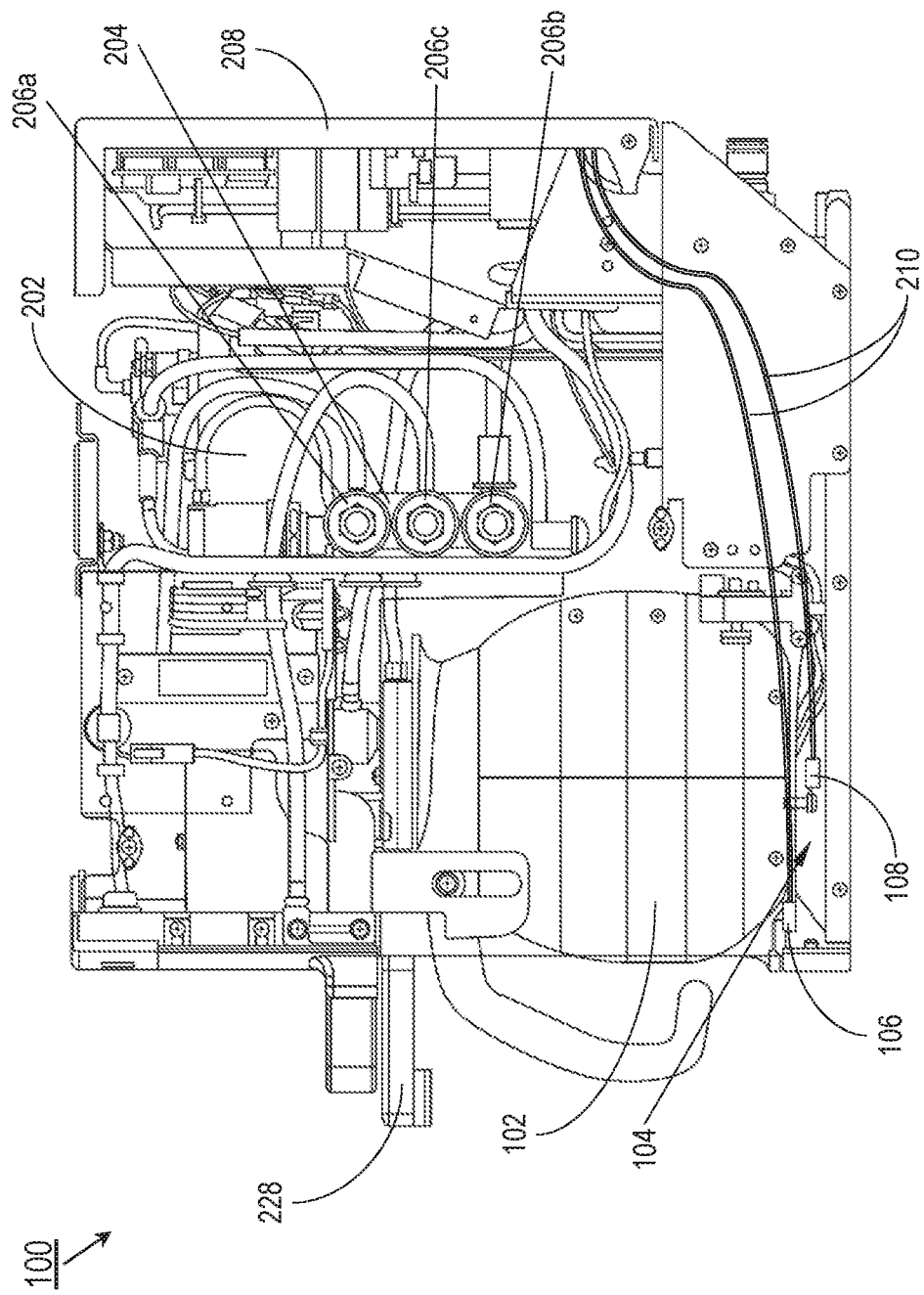

BEVERAGE MAKER PLATEN OVERFLOW SENSING SYSTEM

BACKGROUND

An aircraft beverage maker system consists of a hot water tank plumbed to a manifold that dispenses hot water either into a server (e.g., to brew coffee or tea) or directly from an exterior faucet. The manifold uses solenoid valves controlled by software to dispense the hot water upon command from a flight attendant or cabin crewmember. The standard unit has a server level sensor that sends a signal to software (e.g., when the water level inside the server reaches a threshold), whereby the software then stops the water flow by closing the solenoid valve. However, a malfunction of the software, or of the electrical server level sensor, may result in an undetected or unchecked overflow. For example, software may command a solenoid to stay open, dispensing hot water indefinitely (or until the tank empties) which may in turn overrun the platen drain system.

SUMMARY

A beverage maker platen overflow sensing system is disclosed. In embodiments, the platen overflow sensing system includes a process control board (PCB) housing one or more processors in communication with solenoid valves of a manifold, the solenoid valves controlling the flow of hot water (or another conductive fluid) into a server positioned in or on a platen of the beverage maker. The PCB includes a memory or other data storage for storing software executable by the processor for controlling the solenoid valves. The PCB further includes an overflow detection circuit connected to the solenoid valves. At least two signal probes are positioned near the forward edge of the platen (e.g., a signal probe on either side of the server) and connected to the PCB via wire harness. Similarly, at least two ground probes are positioned in the platen below the signal probes likewise connected to the PCB via wire harness and providing a ground path thereto. The overflow detection circuit generates an electrical signal between the two signal probes and detects an overflow state when hot water overflowing into the platen grounds the signal between at least one of the signal probes and at least one of the ground probes. While the overflow state persists, the overflow detection circuit ceases the flow of hot water by electrically signaling the solenoid valves to close.

A beverage maker platen overflow sensing system is disclosed. In embodiments, the platen overflow sensing system includes a process control board (PCB) housing one or more processors in communication with solenoid valves of a manifold, the solenoid valves controlling the flow of hot water (or another conductive fluid) into a server positioned in or on a platen of the beverage maker. The PCB includes a memory or other data storage for storing software executable by the processor for controlling the solenoid valves. The PCB further includes an overflow detection circuit connected to the solenoid valves. At least two signal probes are positioned near the forward edge of the platen (e.g., a signal probe on either side of the server) and connected to the PCB via wire harness. A platen probe is disposed within a lower portion of the platen (e.g., a disk centrally located), the platen probe electrically connected to the PCB and providing a ground path to the PCB when the beverage maker is in a default (e.g., non-overflow) state. The overflow detection circuit generates an electrical signal between the two signal probes and detects an overflow state when hot water overflowing into the platen grounds the signal between at least one of the signal probes and the platen probe. While the overflow state persists, the overflow detection circuit ceases the flow of hot water by electrically signaling the solenoid valves to close.

A beverage maker device is also disclosed. In embodiments, the beverage maker device includes a housing with a platen capable of accommodating a server, the housing installable in an aircraft galley. Within the housing is a manifold plumbed to a hot water tank and capable of dispensing hot water (e.g., for brewing tea or coffee) from the tank into the server, the dispensing controlled by solenoid valves of the manifold. Externally positioned on the housing is a human-machine interface (HMI) capable of accepting control input from a cabin crewmember (e.g., directions for brewing tea or coffee, or dispensing hot water into the server). Also within the housing is a process control board (PCB) housing one or more processors in communication with solenoid valves of a manifold, the solenoid valves controlling the flow of hot water into a server positioned in or on a platen of the beverage maker. The PCB includes a memory or other data storage for storing software executable by the processor for controlling the solenoid valves. A primary overflow sensor (e.g., server level sensor) positioned at or near the top of the server directs the software on the PCB to shut off the solenoid valves if the water level within the sensor reaches a high enough level. As a secondary overflow sensor (e.g., a hardware-based backup sensor system), the PCB further includes an overflow detection circuit connected to the solenoid valves. At least two signal probes are positioned near the forward edge of the platen (e.g., a signal probe on either side of the server) and connected to the PCB via wire harness. Similarly, one or more ground probes (e.g., platen probes) are positioned in the platen below the signal probes likewise connected to the PCB via wire harness and providing a ground path thereto. The overflow detection circuit generates an electrical signal between the two signal probes and detects an overflow state when hot water overflowing into the platen grounds the signal between at least one of the signal probes and at least one of the ground probes. While the overflow state persists, the overflow detection circuit ceases the flow of hot water by electrically signaling the solenoid valves to close.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A is a diagrammatic cross section.

DETAILED DESCRIPTION

Figure 1:
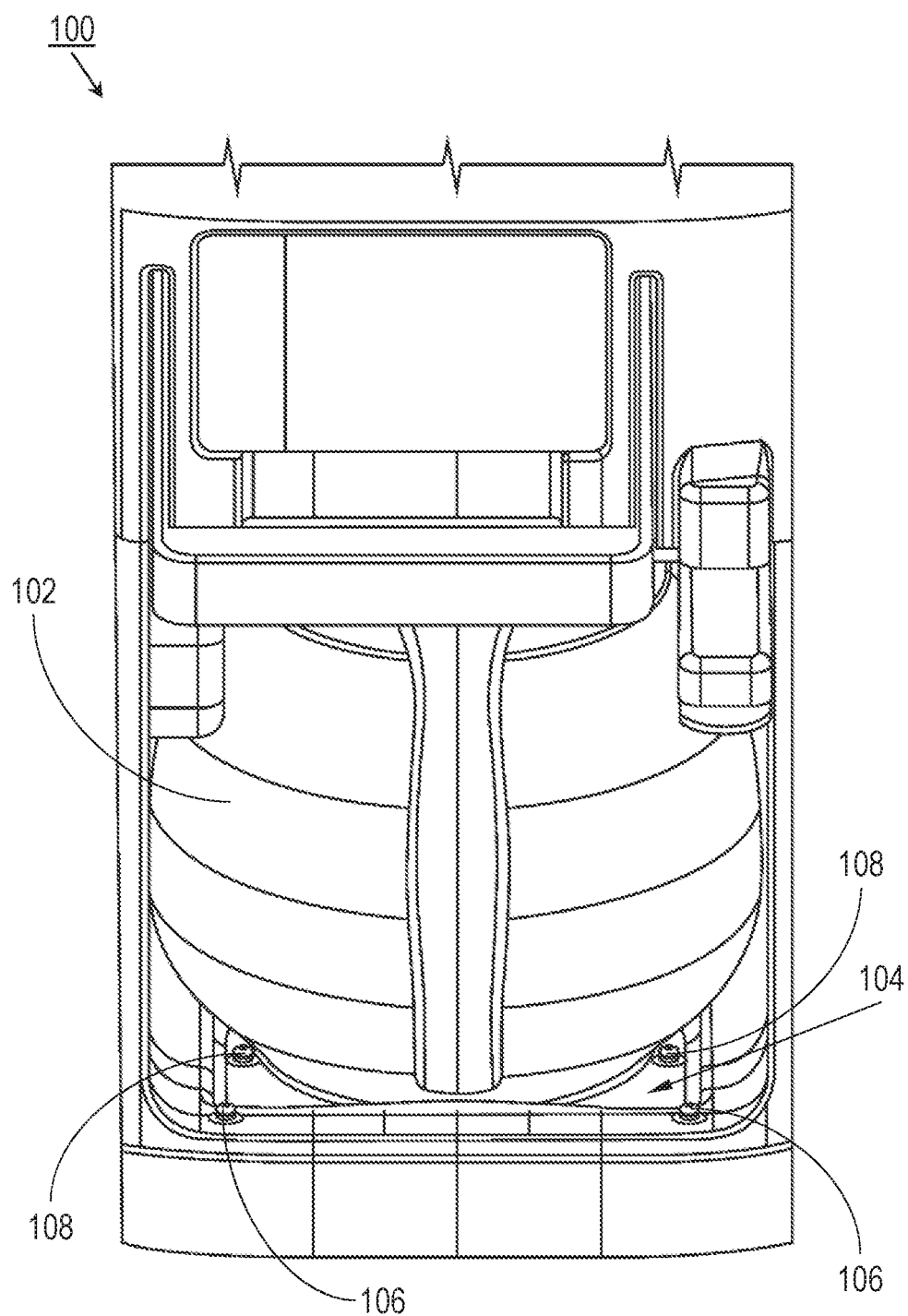
FIG. 1 is a forward view illustrating a beverage maker device in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to an overflow detection system for a beverage maker device (e.g., a device installable in an aircraft galley for brewing or dispensing coffee, tea, and/or hot water). The overflow detection system may serve as a redundant, hardware-based backup system for software-based server-level sensors. Such software-based systems may be vulnerable to software or sensor malfunctions that may fail to address an overflow state, while the hardware-based backup system operates independently of software and resists false-overflow states associated with incidental spillage.

Referring to FIG. 1, a beverage maker device 100 is disclosed. The beverage maker device 100 may include a server 102 insertable in a platen 104 and an overflow detection system comprising signal probes 106 and ground probes 108 positioned within the platen.

In embodiments, the beverage maker device may include two signal probes 106 positioned toward the front of the platen 104, and two ground probes 108 positioned rearward of the signal probes in a lower (e.g., deeper) portion of the platen. For example, under normal operating conditions an electrical signal may be generated between the two signal probes 106. Should the water level within the server 102 (e.g., as the server is being filled by the beverage maker device 100 with hot water) overflow into the platen 104, the overflowing hot water within the platen (e.g., a conductive fluid) may create a ground path from either or both of the signal probes 106 to either or both of the ground probes 108, electronically indicating an overflow state and inducing a shutoff of the hot water flow into the server 102.

Figure 2B:
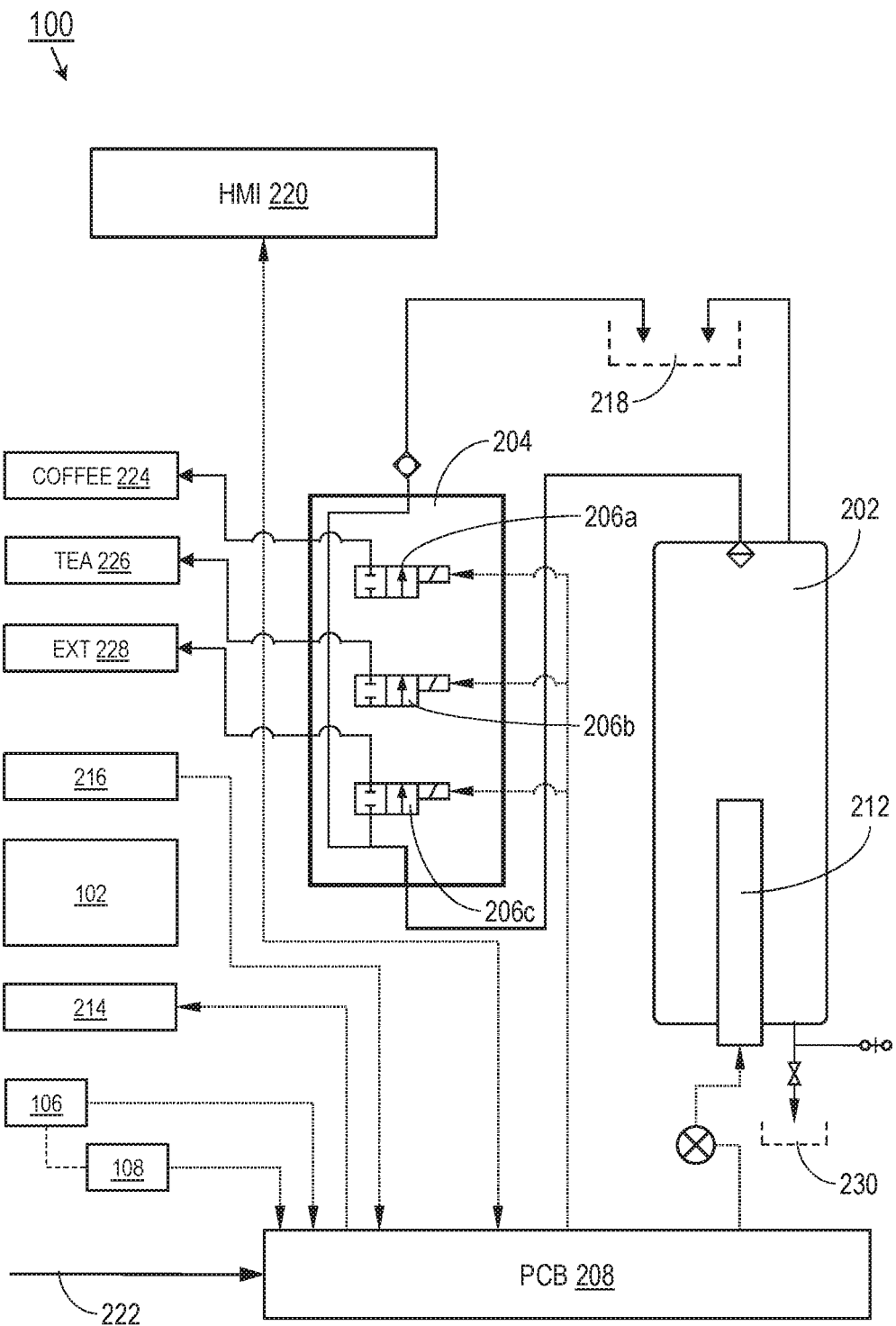
FIG. 2B is a block diagram, illustrating the beverage maker device of FIG. 1.

Referring to FIGS. 2A and 2B, the beverage maker device 100 is shown. In embodiments, the beverage maker device 100 may include a hot water tank 202, a manifold 204, solenoid valves 206a-c, a process control board 208 (PCB), wire harnesses 210, tank heaters 212, a platen heater 214, a server level sensor 216, a platen drain 218, and a human/machine interface 220 (HMI).

In embodiments, the PCB 208 may house an overflow detection circuit connecting the signal probes 106 and ground probes 108 to the solenoid valves 206a-c on the manifold 204. The PCB 208 may be supplied with input power (222) from an aircraft-based power system (e.g., via a galley insert (GAIN) interface by which the beverage maker device 100 is connected to aircraft power supplies and networks).

The hot water tank 202 may be plumbed to the manifold 204 for dispensing hot water from the hot water tank, e.g., for the brewing of coffee (224) to an external brew cup (via the solenoid valve 206a), for the brewing of tea (226) via hot water dispensed to the server 102 (via the solenoid valve 206b), or for the dispensing of hot water through an external faucet 228 (via the solenoid valve 206c). In some embodiments, as the outflow of the external faucet 228 is external to the platen (104, FIG. 1), the solenoid valve 206c may not be regulated by the overflow detection circuit. The water may be heated by tank heaters 212 within the hot water tank 202 and kept warm by the platen heater 214 within the platen 104 (e.g., directly underneath and in contact with the server 102). The hot water tank 202 may include an external drain 230; further, the platen 104 may be plumbed to the platen drain 218, allowing any spillage within the platen to flow to an aircraft wastewater system.

In embodiments, the PCB 208 may include software (e.g., stored to memory or otherwise loaded to the PCB) for controlling the solenoid valves 206a-c to dispense hot water based on control input submitted via the HMI 220 (e.g., via a cabin crewmember or flight attendant). Under normal conditions, the signal probes 106 and ground probes 108 (positioned on the platen 104 below the signal probes) may be connected to the PCB 208 via the wire harnesses 210. The PCB 208 may create an electrical signal between the signal probes 106 while the ground probes 108 provide a ground path back to the PCB.

Figure 3:
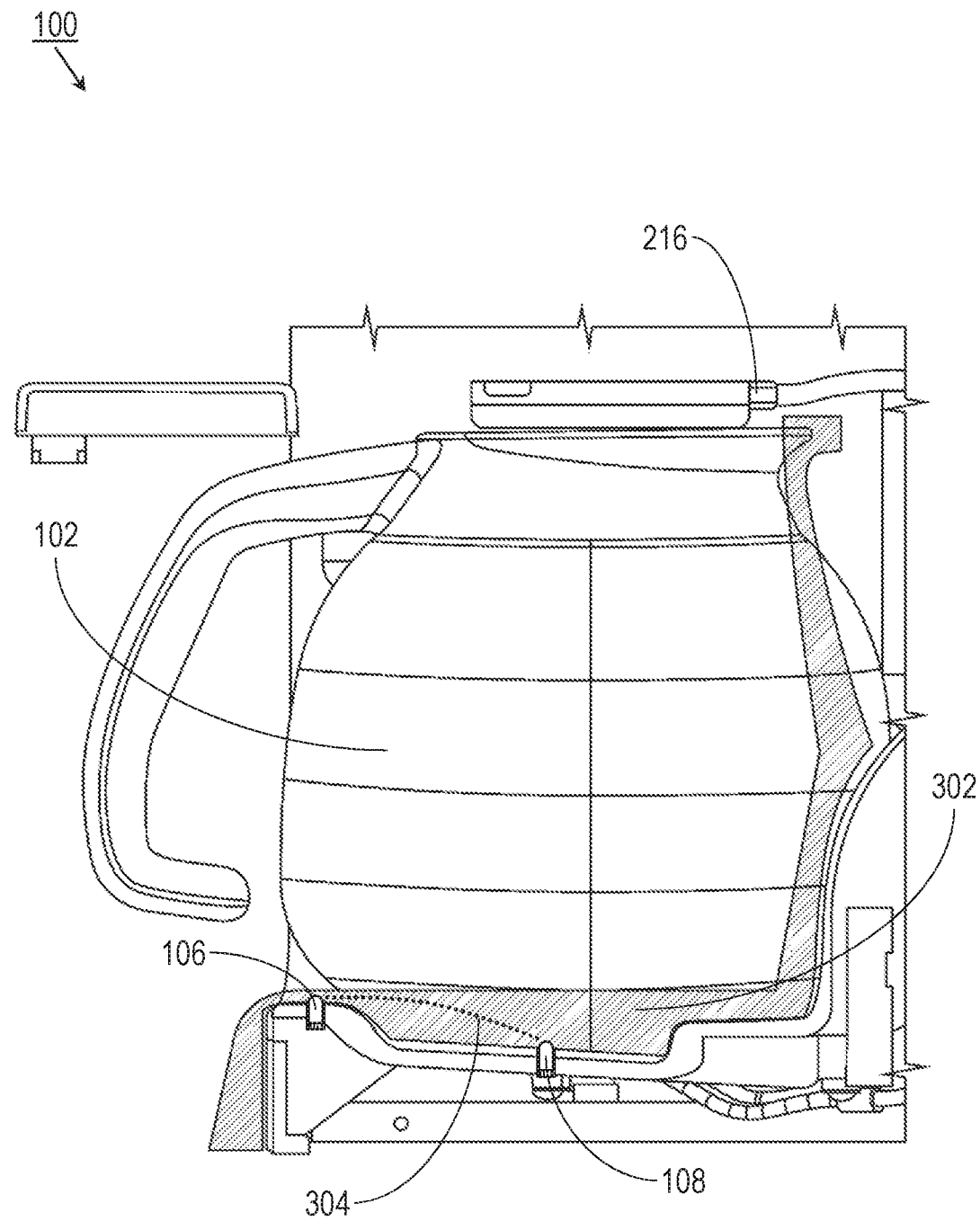
FIG. 3 is a profile view illustrating the beverage maker device of FIG. 1.

Referring now to FIG. 3, the beverage maker device 100 is shown. In embodiments, an overflow state of the beverage maker device 100 may exist when the platen 104 is substantially filled with fluid 302 (hot water or any other appropriate conductive or water-based fluid). For example, fluid 302 within the platen 104 may create a connection, or grounded signal 304, between the signal probes 106 and the ground probes 108. The server level sensor 216 may be positioned toward the top of the server 102 such that, if the server level sensor detects a water level consistent with an overflow state (e.g., at or above the level of the server level sensor), the server level sensor may direct the software loaded onto the PCB (208, FIGS. 2A/B) to close the solenoid valves (206a-b, FIGS. 2A/B) stopping the flow of water from the manifold (204, FIGS. 2A/B).

In embodiments, the signal probes 106 and ground probes may directly sense the spillage or overflowing of fluid 302 into the platen 104 (as opposed to indirectly measuring flow rates or pressure losses) and respond thereto by generating the grounded signal 304. When the overflow detection circuit on the PCB 208 detects the grounded signal 304 (as opposed to the standard electrical signal between the signal probes 106), the overflow detection circuit may close the solenoid valves 206a-b to stop the flow of hot water through the manifold 204 into the platen 104. As long as the overflow state persists, the overflow detection circuit may prevent the solenoid valves 206a-b from opening (e.g., until the fluid 302 causing the grounded signal 304 is terminated and the electrical signal between the signal probes 106 is restored).

In embodiments, the signal probes 106 may be positioned toward the forward edge of the platen 104. Similarly, the ground probes 108 may be positioned more centrally and lower in the platen 104, such that the signal probes are above the ground probes. Accordingly, incidental spillage within the platen 104 may not rise to the level of the signal probes 106 and thus may not trigger the detection of an overflow state by the overflow detection circuit; in these cases the operation of the solenoid valves 206a-b may not be interrupted.

Figure 4A:
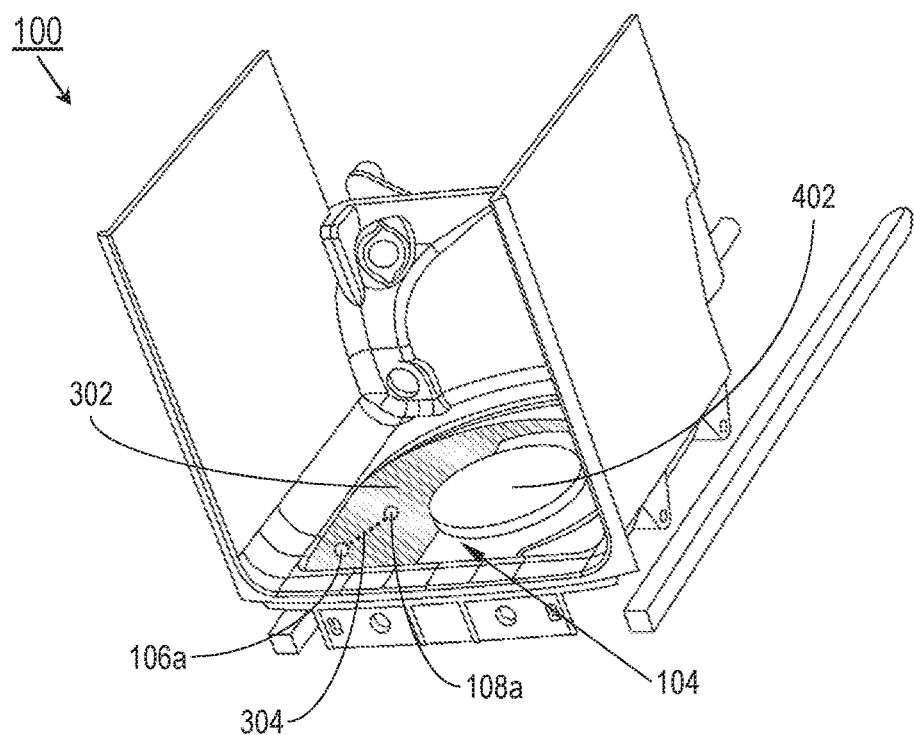
FIGS. 4A and 4B are isometric views illustrating a platen of the beverage maker device of FIG. 1.

Referring to FIG. 4A, the beverage maker device 100 is shown. The overflow detection circuit on the PCB (208, FIGS. 2A/B) may detect the overflowing or spillage of fluid (302) at a variety of angles, regardless of the positioning of the beverage maker device 100 within the aircraft galley or the current angle of flight. For example, if the spillage of fluid 302 occurs only within a portion of the platen 104, a ground path may be established only between the signal probe 106a and the ground probe 108a. The resulting grounded signal (304) may still be detected by the overflow detection circuit, resulting in the PCB (208, FIGS. 2A/B) shutting down the solenoid valves (206a-b, FIGS. 2A/B).

In embodiments, the signal probes 106 and ground probes 108 may be raised or elevated from their surrounding platen surfaces, such that the probes are resistant to debris and scale and easily cleaned by cabin crew. In some embodiments, the lower surface of the platen 104 may be designed or shaped to direct the flow of fluid 302 away from the central portion 402 (which may include the platen heater (214, FIG. 2B)) toward the signal probes 106. Further, the forward placement of the signal probes 106 may ensure that the overflow detection signal closes the solenoid valves 206a-b only when the fluid 302 overflows toward the front of the platen 104.

Figure 4B:
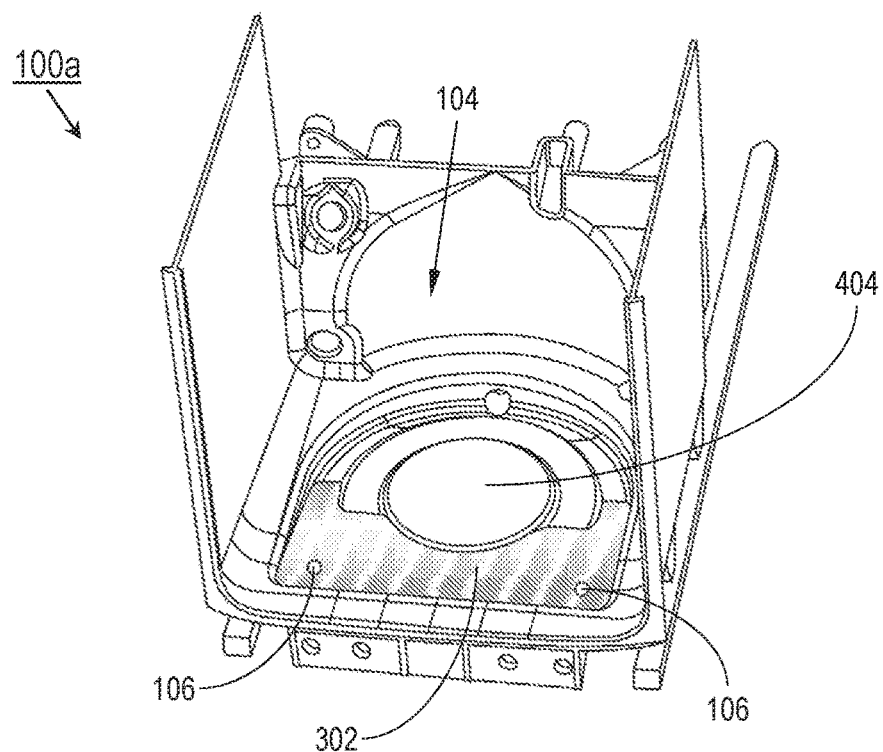

Referring in particular to FIG. 4B, the beverage maker device 100a is shown. The beverage maker device 100a may be implemented and may function similarly to the beverage maker device 100 of FIGS. 1-4A, except that in place of the ground probes (108, FIG. 1) the beverage maker device 100a may incorporate a single ground probe incorporated into a disk 404 (or any other appropriately shaped electrically conductive material) centrally located within the platen 104. For example, any connection between a signal probe 106 and the disk 404 via the overflowing fluid 302 may result in a grounded signal detectable by the overflow detection circuit.

Figure 5:
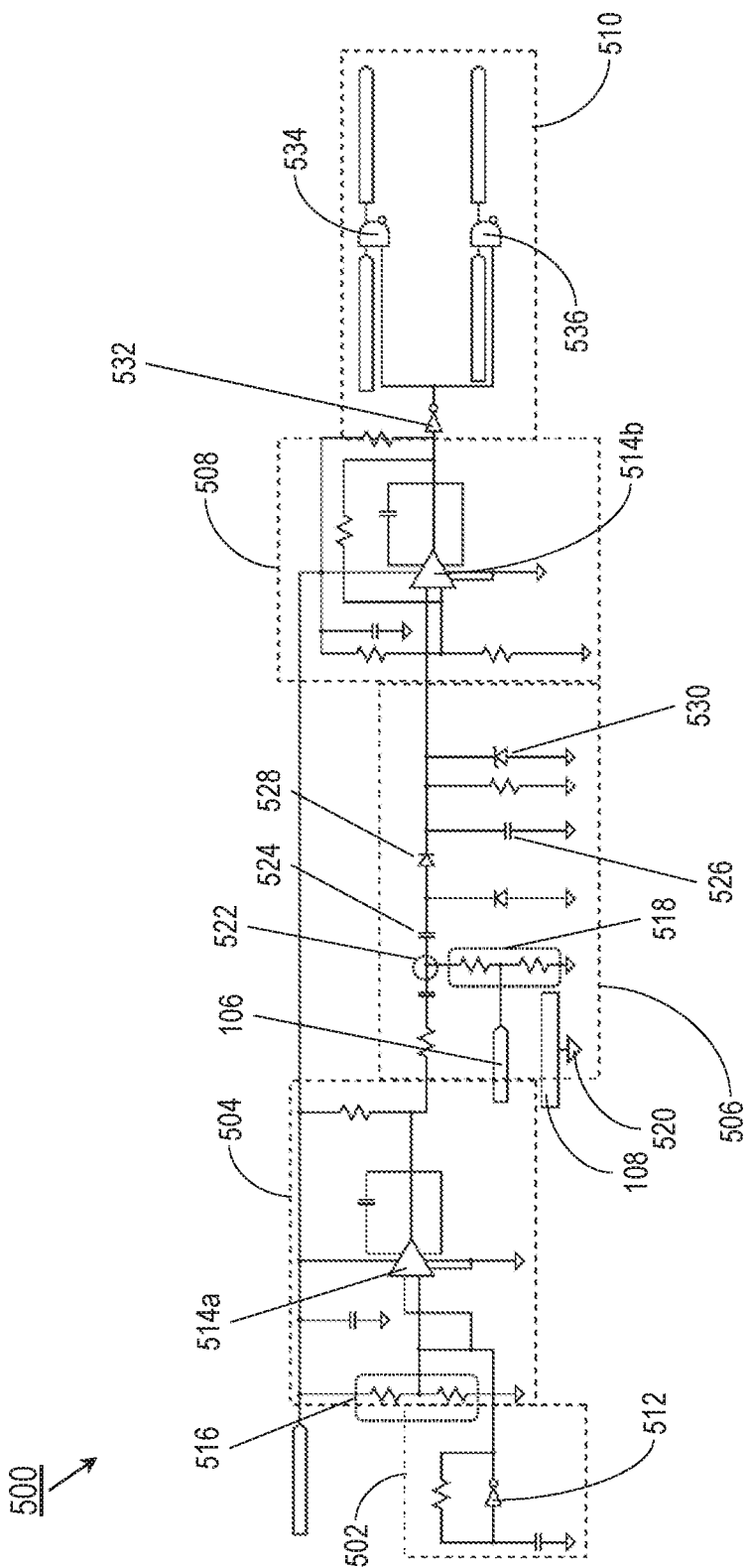
FIG. 5 is a schematic diagram illustrating an overflow detection circuit of the beverage maker device of FIG. 1.

Referring to FIG. 5, the overflow detection circuit 500 may be positioned on the PCB (208, FIG. 2A/B) for detection of an overflow state within the platen (104, FIG. 1) of the beverage maker devices 100, 100a of FIGS. 1-4B. Broadly speaking, the overflow detection circuit 500 is entirely hardware-based, operating independently of software, and allows the solenoid valves (206a-b, FIGS. 2A/B) controlling coffee and tea brewing (224/226, FIG. 2B) to open only if an overflow condition is not detected.

In embodiments, the overflow detection circuit 500 comprises five sections 502, 504, 506, 508, 510. For example, the first section 502 may include an inverter 512 (e.g., Schmitt trigger CD40106) for generating an oscillating signal between the signal probes 106 (e.g., 1 kHz, 50% duty cycle, 0V to 5V peak to peak logic level square wave) to be buffered and conditioned and appear on signal probes 106, easily grounded by a conductive fluid (e.g., fluid 302, FIG. 3). The oscillating nature of the signal may further mitigate the accumulation of hard water scale on the signal probes 106 and ground probes 108.

In embodiments, the second section 504 may include a comparator 514a (e.g., half of a LM193D dual comparator, the other half 514b incorporated into the fourth section 508) for comparing the square wave output of the first section 502 to a reference signal (e.g., a ½ Vcc reference created by the resistors 516) and generating a buffered output.

In embodiments, the third section 506 may receive the buffered 1 kHz output of the second section 504 and remove its DC component, sending the resulting signal to the voltage divider 518. The signal probes 106 may be connected to the voltage divider 518 while the ground probes 108 are connected to the ground circuit 520. Under normal conditions, when the signal between the signal probes 106 is ungrounded, the buffered signal may remain nominal (e.g., ~2.5 V peak) at point 522 at the top of the voltage divider 518. The third section 506 may further include capacitors 524, 526 (respectively for AC coupling and smoothing of the 0 V-~2.2 V signal) and diodes 528, 530 (respectively for half-wave rectification of the signal and protection against overvoltage). However, when the signal probe 106 is shorted by fluid 302 within the platen 104, creating the grounded signal 304 to ground probe 108 and the ground circuit 520, the signal at point 522 may drop to near zero voltage.

In embodiments, the fourth section 508 includes the second comparator 514b (e.g., the second half of the dual comparator device, along with the first comparator 514a) which may compare the 0 V-~2.2V output signal of the third section 506 with another reference signal (e.g., a 1V reference). When the signal probes 106 and ground probes 108 are shorted (e.g., 0 V) the output of the second comparator 514b may be HIGH, and when not shorted (e.g., ~2.2 V) the comparator output may be LOW.

In embodiments, the fifth section 510 includes a second inverter 532 and logic gates 534, 536 (e.g., CD4081 AND gates) associated with signals to driver transistors within the respective solenoid valves 206a, 206b. For example, logic gate 534 may control the signal to the solenoid valve (206b, FIGS. 2A/B) regulating tea brewing (226, FIG. 2B) while the logic gate 536 may control the signal to the solenoid valve (206*a*, FIGS. 2A/B) regulating coffee brewing (224, FIG. 2B). For example, when the signal probes 106 are unshorted (e.g., output of the second comparator 514*b* is LOW), the LOW signal may be sent to the second inverter 532 and the HIGH inverter output sent to logic gates 534, 536 in order that the signals to the driver transistors of the tea and coffee solenoid valves 206*a*, 206*b* are passed. However, when the signal probes 106 are shorted to the ground probes 108 (e.g., grounded signal 304, FIG. 3) and the output of the second comparator 514*b* is HIGH, the HIGH signal may be sent to the second inverter 532 and the LOW inverter output sent to logic gates 534, 536 instead, turning off the driver transistor signals for the respective tea and coffee solenoid valves 206*a*, 206*b*.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A beverage maker platen overflow sensing system, comprising:
    at least one process control board (PCB) comprising:
        at least one processor communicatively coupled to one or more solenoid valves, the solenoid valves configured to control a flow of a fluid into a server positioned in a platen;
        at least one memory coupled to the processor, the memory configured to store encoded instructions for controlling the solenoid valves, the encoded instructions executable by the processor;
        and
        an overflow detection circuit electrically coupled to the solenoid valves;
    at least two signal probes disposed within a forward portion of the platen, the signal probes electrically coupled to the PCB via wire hardness;
    and
    at least two ground probes disposed within a lower portion of the platen, the ground probes electrically coupled to the PCB and configured to provide a ground path to the PCB when the system is in a default state;
    the overflow detection circuit configured to:
        generate at least one electrical signal between the signal probes;
        detect an overflow state of the system based on a ground signal between at least one of the signal probes and at least one of the ground probes, the ground signal conducted by the fluid;
        and
        when the overflow state is detected, cease the flow by electrically closing the solenoid valves.

2. The beverage maker platen overflow sensing system of claim 1, wherein the signal probes are disposed above the ground probes.

3. The beverage maker platen overflow sensing system of claim 1, wherein:
    the sensing system is embodied in a beverage maker installable in an aircraft galley;
    and
    the solenoid valves are embodied in a manifold configured to dispense the fluid from a tank of the aircraft.

4. The beverage maker platen overflow sensing system of claim 3, wherein:
    the beverage maker includes a server level sensor electronically coupled to the PCB and configured to:
        detect a fluid level of the server;
        and
        if the fluid level reaches a level threshold, transmit a signal to the processor to cease the flow via the encoded instructions.

5. The beverage maker platen overflow sensing system of claim 1, wherein the overflow detection circuit is configured to electronically reopen the solenoid valves on termination of the ground signal.

6. The beverage maker platen overflow sensing system of claim 1, wherein the platen is shaped to direct the fluid toward one or more of the signal probes.

7. The beverage maker platen overflow sensing system of claim 1, wherein:
    the electrical signal is an oscillating signal;
    and
    the ground signal is generated by a shorting of the electrical signal.

8. The beverage maker platen overflow sensing system of claim 1, wherein the overflow detection circuit includes at least one comparator configured to detect the overflow state by comparing at least one of the electrical signal and the ground signal to a reference signal.

9. A beverage maker platen overflow sensing system, comprising:
    at least one process control board (PCB) comprising:
        at least one processor communicatively coupled to one or more solenoid valves, the solenoid valves configured to control a flow of a fluid into a server positioned in a platen;
        at least one memory coupled to the processor, the memory configured to store encoded instructions for controlling the solenoid valves, the encoded instructions executable by the processor;
        and
        an overflow detection circuit electrically coupled to the solenoid valves;
    at least two signal probes disposed within a forward portion of the platen, the signal probes electrically coupled to the PCB via wire hardness;
    and
    a platen probe disposed within a lower portion of the platen, the platen probe electrically coupled to the PCB and configured to provide a ground path to the PCB when the system is in a default state;
    the overflow detection circuit configured to:
        generate at least one electrical signal between the signal probes;

detect an overflow state of the system based on a ground signal between at least one of the signal probes and the platen probe, the ground signal conducted by the fluid;

and when the overflow state is detected, cease the flow by electrically closing the solenoid valves.

10. The beverage maker platen overflow sensing system of claim 9, wherein:

the platen probe is centrally disposed within the platen;

and the signal probes are disposed above the platen probe.

11. The beverage maker platen overflow sensing system of claim 9, wherein:

the system is embodied in a beverage maker installable in an aircraft galley;

and the solenoid valves are embodied in a manifold configured to dispense the fluid from a tank of the aircraft.

12. The beverage maker platen overflow sensing system of claim 11, wherein:

the beverage maker includes a server level sensor electronically coupled to the PCB and configured to:

detect a fluid level of the server;

and if the fluid level reaches a level threshold, transmit a signal to the processor to cease the flow via the encoded instructions.

13. The beverage maker platen overflow sensing system of claim 9, wherein the overflow detection circuit is configured to electronically reopen the solenoid valves on termination of the ground signal.

14. The beverage maker platen overflow sensing system of claim 9, wherein the platen is shaped to direct the fluid toward one or more of the signal probes.

15. The beverage maker platen overflow sensing system of claim 9, wherein:

the electrical signal is an oscillating signal.

16. The beverage maker platen overflow sensing system of claim 9, wherein the ground signal is generated by a shorting of the electrical signal.

17. The beverage maker platen overflow sensing system of claim 9, wherein the overflow detection circuit includes at least one comparator configured to detect the overflow state by comparing at least one of the electrical signal and the ground signal to a reference signal.

18. A beverage maker device, comprising:

a housing including a platen configured to accommodate a server, the housing installable in an aircraft galley;

a manifold disposed within the housing, the manifold configured to dispense a fluid from a tank into the server, the dispensing of the fluid controlled by one or more solenoid valves of the manifold;

a human-machine interface (HMI) disposed within the housing and configured to receive control input from an operator;

a process control board (PCB) disposed within the housing, the PCB comprising:

at least one control processor communicatively coupled to the solenoid valves;

and at least one memory coupled to the control processor, the memory configured to store encoded instructions associated with controlling the solenoid valves, the instructions executable by the control processor;

a primary overflow sensor coupled to the server, the primary overflow sensor configured to:

detect a fluid level within the server;

and when the fluid level reaches a level threshold, transmit an overflow signal to the control processor, the control processor configured to cease the dispensing of the fluid according to the encoded instructions on receiving the overflow signal;

and a secondary overflow sensor system, comprising:

at least two signal probes disposed within a forward portion of the platen, the signal probes electrically coupled to the PCB via wire hardness;

at least one ground probe disposed within a lower portion of the platen, the ground probe electrically coupled to the PCB and configured to provide a ground path to the PCB when the device is in a default state;

and an overflow detection circuit disposed within the PCB and electrically coupled to the solenoid valves, the overflow detection circuit configured to:

generate at least one electrical signal between the signal probes;

detect an overflow state of the device based on a ground signal between at least one of the signal probes and the ground probe, the ground signal conducted by the fluid;

and when the overflow state is detected, cease the dispensing of the fluid by electrically closing the solenoid valves.

19. The beverage maker device of claim 18, wherein:

the at least one ground probe is disposed below the at least two signal probes;

and the platen is shaped to direct the fluid toward one or more of the signal probes.

20. The beverage maker device of claim 18, wherein the at least one ground probe is centrally disposed within the platen.

* * * * *